June 14, 1966 T. V. SHAFER ETAL 3,255,471
BOATS AND CERTAIN APPURTENANCES THEREOF OR THEREFOR
Filed June 13, 1962 5 Sheets-Sheet 1
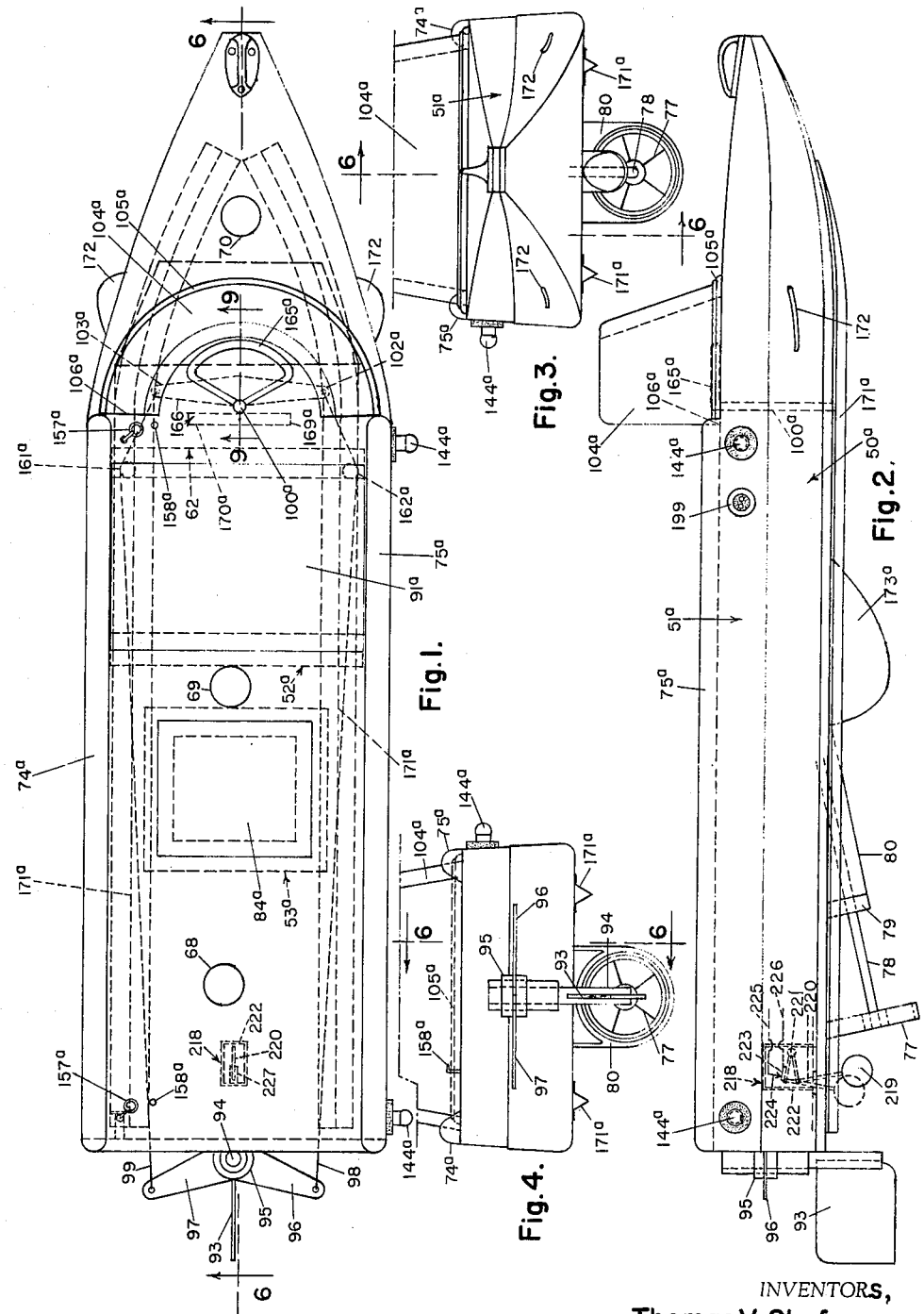
INVENTORS,
Thomas V. Shafer,
BY Harry F. Stapay &
Charles W. Adkins,
Atty.

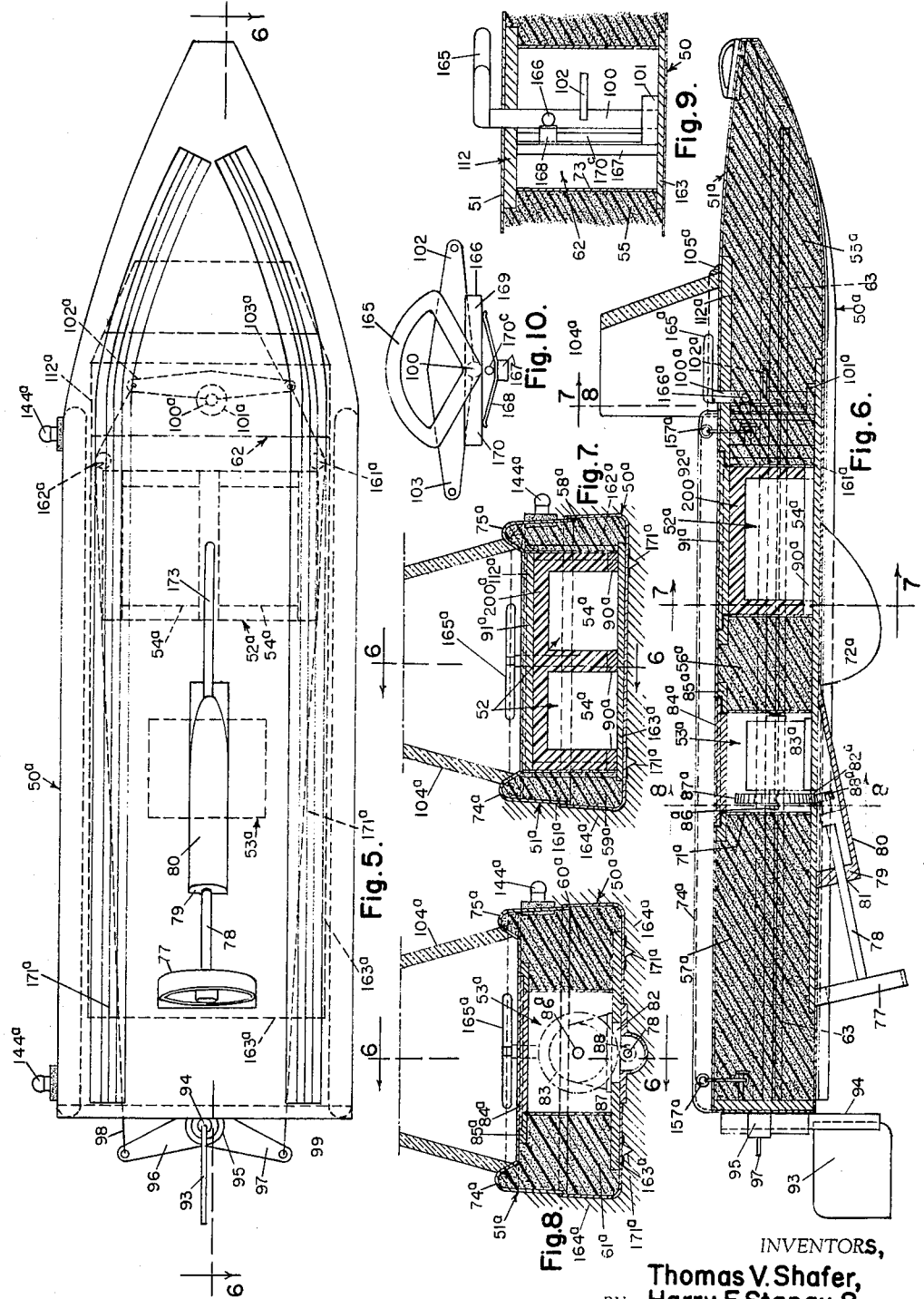

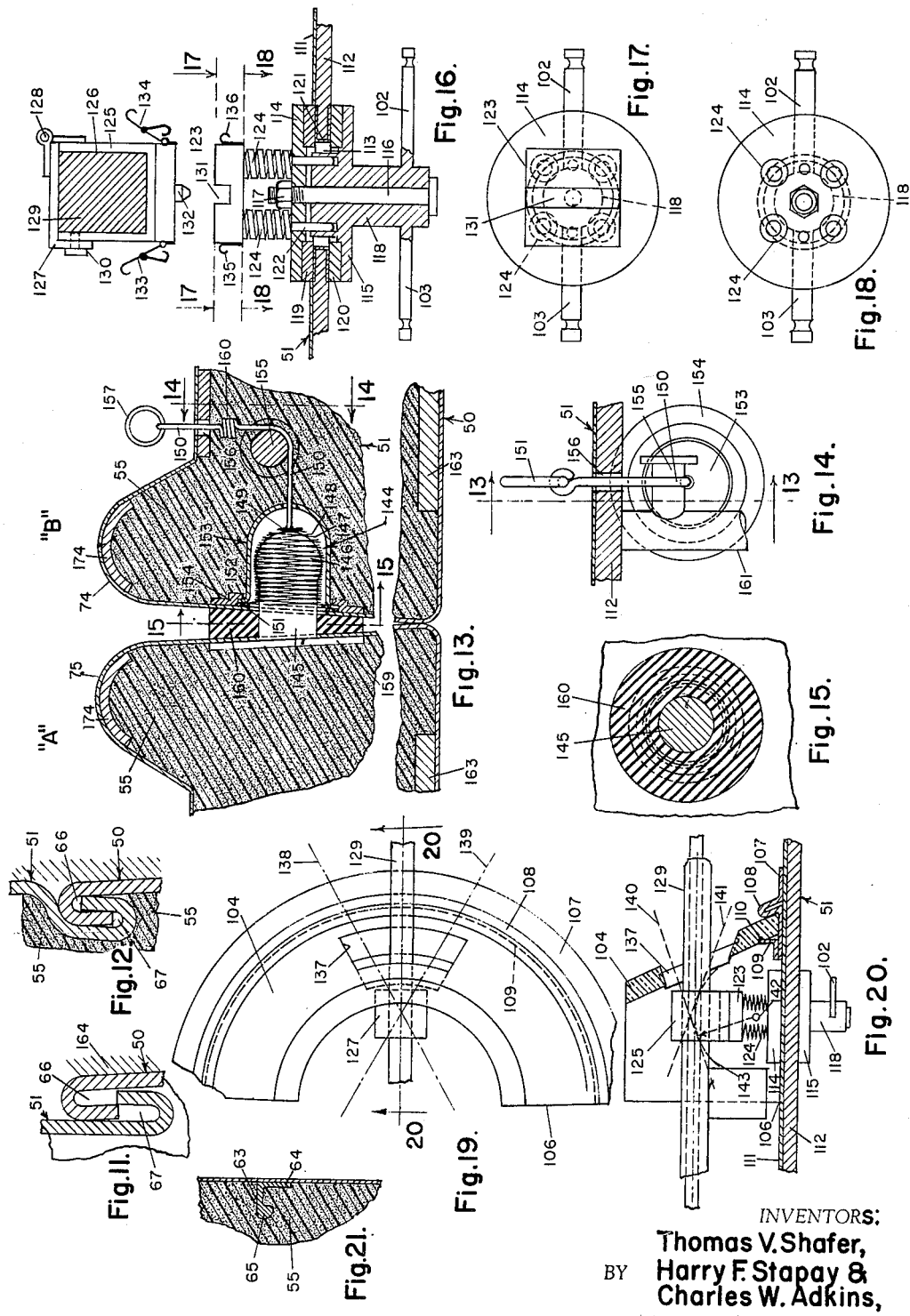

June 14, 1966  T. V. SHAFER ETAL  3,255,471
BOATS AND CERTAIN APPURTENANCES THEREOF OR THEREFOR
Filed June 13, 1962  5 Sheets-Sheet 4
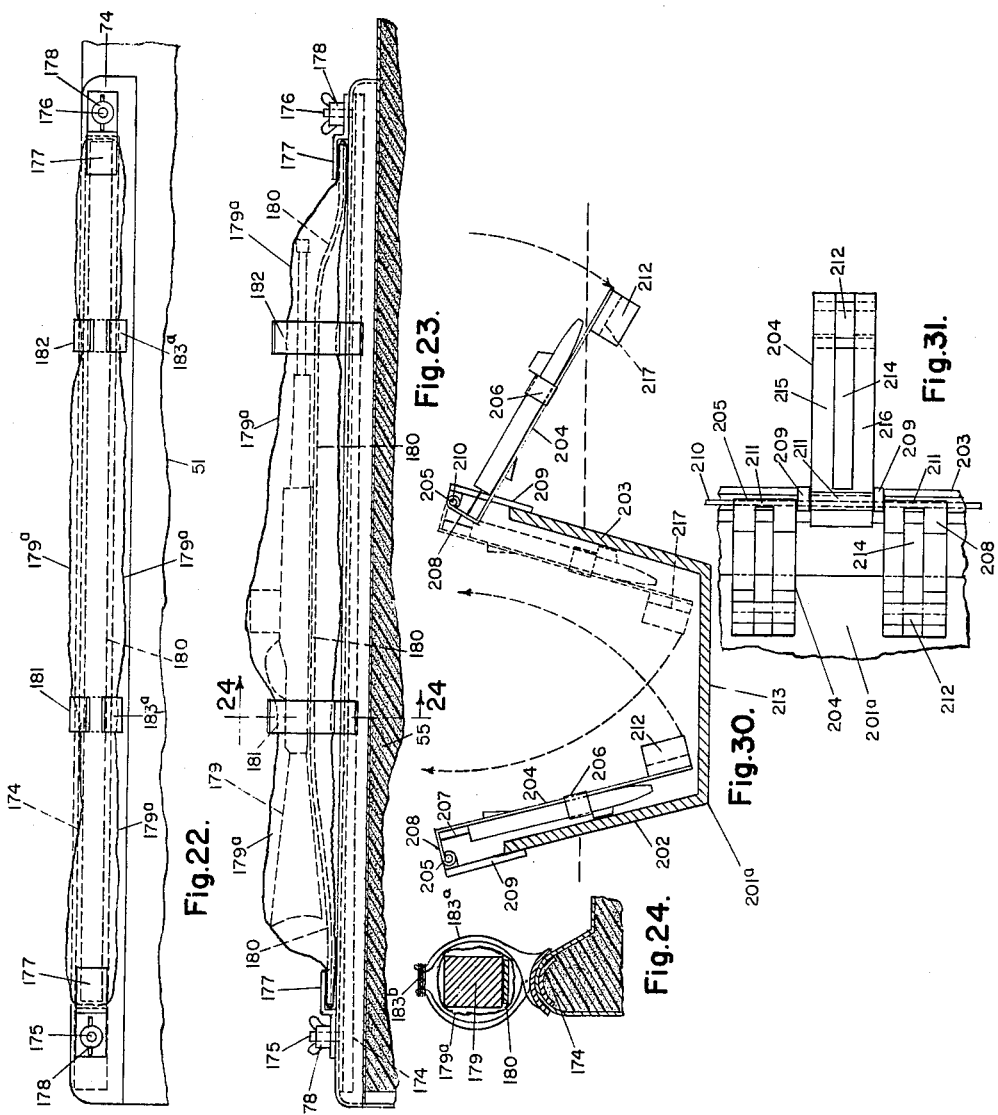
INVENTORS
Thomas V. Shafer,
BY Harry F. Stapay &
Charles W. Adkins,
Atty.

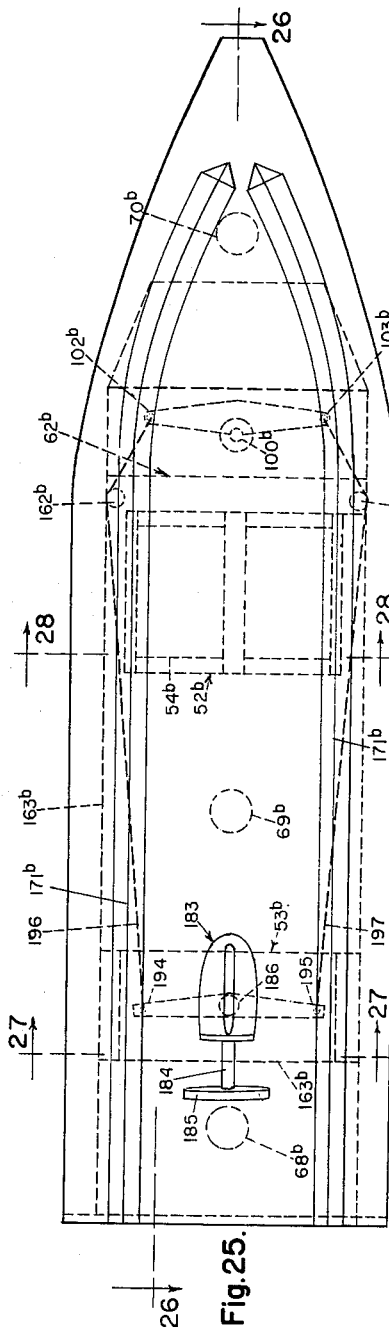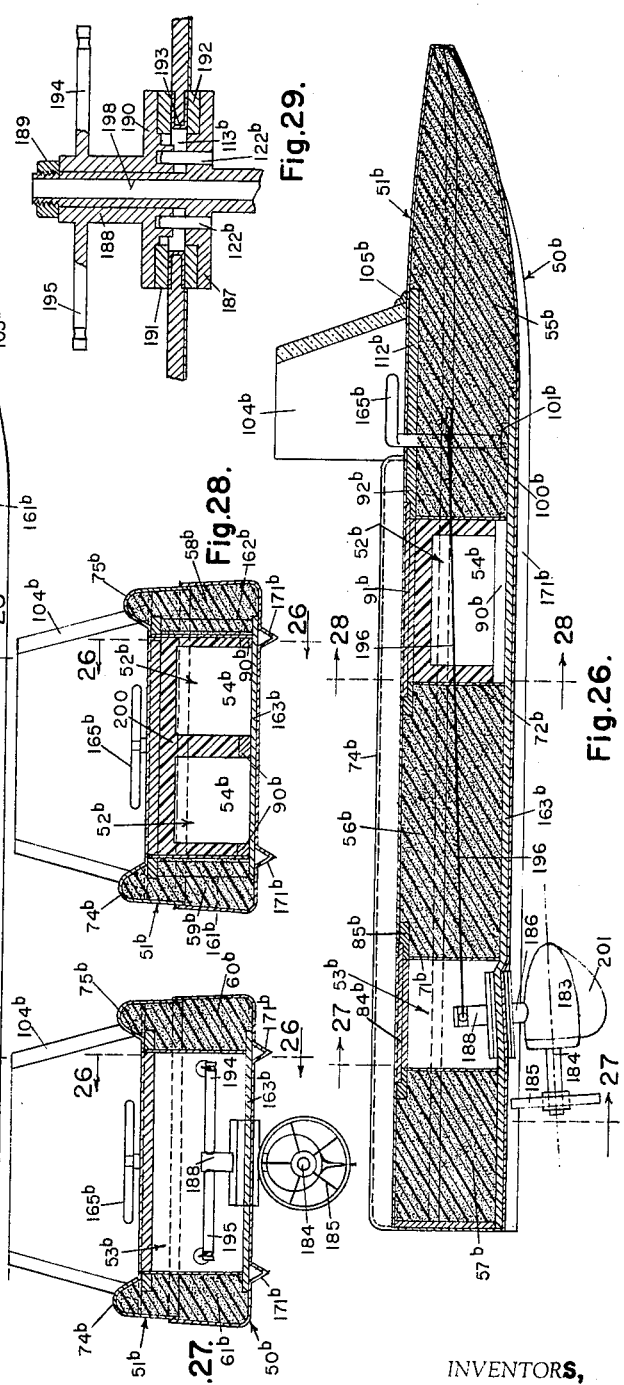

United States Patent Office 3,255,471
Patented June 14, 1966

3,255,471
BOATS AND CERTAIN APPURTENANCES THEREOF OR THEREFOR
Thomas V. Shafer, Villa Park, Ill. (10068 Franklin St., Franklin Park, Ill.), and Harry F. Stapay, Joliet, and Charles W. Adkins, New Lenox, Ill.; said Stapay and said Adkins assignors to said Shafer
Filed June 13, 1962, Ser. No. 206,538
12 Claims. (Cl. 9—6)

This invention relates to improvements in boats and certain appurtenances thereof or therefor. Specifically, but without limitation thereto, the hereinafter disclosed improvements relate to boats for military purposes, and generally referred to as landing craft. Such boats are of shallow draft and generally flat-bottom construction for ready movement onto the beach for the landing operation. The hereinafter disclosed embodiments of our invention are of the foregoing type, by way of illustration only, except as we may claim features in broad terms.

A prime object of our invention relates to the provision of a boat construction which is actually non-sinkable when carrying its intended load, even when its body may be riddled with fire from the shore or elsewhere. Such non-sinkable quality is attained by forming substantial portions of the hull of light porous non-permeable material, such material being possessed of the quality that it includes a myriad of self contained pores which are sealed off from fluid communication with the adjacent pores; so that fluids, either gaseous or liquid, may not flow into the pores whose walls have not been broken, from adjacent and proximate pores which shall have been punctured, as by rifle fire, from the shore. The pores of such material are individually filled with gas, and the walls of the pores comprise thin or film-like material interlaced throughout the body of the material, such walls being impervious to water, either fresh or salt, including water of the salinity of sea-water. Thus such walls of the porous non-permeable material are also unaffected chemically by the salinity of the sea-water and its saline contents. Accordingly, in case of intrusion of such sea-water into a series of the pores, as by a rifle shot which penetrates into or through the hull of the boat, only those pores whose walls shall have been punctured by such rifle shot, will be invaded by the water, the pores surrounding the path of such rifle shot and whose walls have not been punctured or fractured, remaining gas tight and sealed. Thus the quality of non-permeability of the material prevents transfer of water from the pores lying in the path of the rifle projectile, to other pores not within such path.

It is evident that a block of such porous, non-permeable material cannot become water-logged sinced its many pores each retain the gas naturally present therein, with corresponding retention of the buoyancy of the block, whose volume comprises the summation of the numerous pores plus the small volume of the material of which the walls of such pores are composed. The percent porosity of the block depends on the volume of such wall material, but in the examples of such material hereinafter mentioned by way of illustration only, and not by way of limitation except as we may limit ourselves in the claims to follow, such wall material comprises a very small percent of the total volume and comprises very low specific gravity material, such as polyurethane or the like. This kind of material will be referred to hereinafter in further detail as useful for producing the boat structures herein disclosed, and according to methods to be described hereinafter.

The pores of the material are filled with gas, of composition depending on the reaction by which the porous material is produced; but in any case such gas content of the pores is of the order of specific gravity of air at sea-level pressure, and thus far less than the specific gravity of the water, especially sea-water with its saline content.

By way of example, a block of material suitable for use according to the present invention, having a volume of substantially 12 cu. in. weighs substantially one-fourth ounce. The pores of such block are of the order of 12 per inch in each direction, so that there are substantially 1728 pores per cu. in. Such pores are of the order of 0.0833 inch in size. They are of somewhat hexagonal section, and are meshed together in the general form of a honeycomb; and the pores are isolated from each other—non-permeable—by the walls of the body material. Such material therefore weighs substantially 36 ounces per cu. ft., that is, 2.25 # per cu. ft. Sea-water weighs substantially 64 pounds per cu. ft. at normal temperature. Accordingly, a body of such material one cu. ft. in size will produce a buoyancy of substantially 61.75 pounds when fully immersed in such sea-water. Such material is substantially neutral or unaffected by the salinity of the sea-water, so that such immersion for an indefinite interval will not produce such corrosion of the walls of the pores as might destroy the non-permeability of the material, by permitting water-logging produced by transfer of the water successively from pore to pore until the pores might all become filled with such water, with destruction of the buoyancy of the material.

An example of such a material as just above described is a polyurethane resin produced as a foam formed material. It may be produced by the reaction of a diisocyanate with a compound containing at least two active hydrogen atoms, such as a diol, diamine, or dicarboxylic acid. Polymers for foams are frequently prepared by the reaction of toluene diisocyanate with a polyester having unreacted —OH groups. For the production of foamed products, advantage is taken of the fact that the isocyanate group will react with water or carboxylic acids to yield carbon dioxide and either an amine or an amide. The amino groups can react with additional isocyanate to form cross linkages. Thus by starting with a polyester having a known quantity of free carboxylic groups as well as free —OH groups, or by adding a predetermined quantity of water to the polyester containing free —OH groups, insoluble cross linked foams of desired density can be prepared. The foamed products can be cast in place. The material described in the preceding paragraph is such a material as just described, and formed by foaming operations, according to the method just described. (See McGraw-Hill Encyclopedia of Science and Technology, 1960, vol. 10, page 493, et seq.)

Such operations as just described may be carried forward by bringing together the two reacting bodies at the location where the porous body is to be incorporated—for example, in the hull of the boat to be produced. For this purpose it is convenient to first produce a hull form of proper contour, and size and stability, into which the reacting components are introduced simultaneously, as by use of a double nozzle unit, with provision for supplying the two components to such nozzles in proper proportions, to produce the mixing action in situ within such pre-prepared hull. Such hull may conveniently comprise a thin sheet metal body, set into a female container of corresponding size and contour shown schematically in FIGURES 7 and 8 by the cross hatching outside of the hull. Thus such thin sheet metal hull will be laterally supported during the foaming operation. Thus the forming operation will result in production of a porous body within such hull form, extending throughout all of the desired portions of the hull. If the to-be-formed boat is to include one or more holds for reception of units, such as a drive motor for driving the propeller, and batteries for supplying current for driving such propeller motor, suitable structural elements may be provided in the body of the pre-prepared hull of sheet metal, to prevent the foaming material from intruding into such hold spaces. For example, such hold spaces may be defined by thin sheet metal partitions set vertically within the hull, at proper locations, and of proper size; such partitions then remaining as permanent portions of the completed boat. Or, removable blocks of proper size and contour may be set down into the pre-prepared sheet metal hull, to block off the foaming material from intruding into such hold spaces; and in such case, such blocks may be removed vertically after the foaming operation has been completed, such foaming material having substantially no adherent qualities to adhere to such blocks when made of wood or various sheet metals.

The pre-prepared hull of thin sheet metal into which the foaming components are introduced, conveniently comprises sheet aluminum or other substantially inert metal which is formed into the desired boat contour. This includes the hull bottom, sides, and deck, and in some cases, a stern of flat form. Preferably two sections of such hull are used, being separated on a horizontal plane at substantially the mid-point of the height of the hull. These sections should be held together along the seam of their conjunction, and the two sections should be so designed that they may be readily set together and then locked together prior to or during the foaming operation. We have hereinafter disclosed suitable interlocking edge portions of the two sheet metal hull unit, which edge portions will be locked together during the foaming operation. In this connection it is noted that during the foaming operation the components suffer a slight swelling of body volume, amounting to one or a few percent. We have so designed the hull sections that such swelling during the foaming operation serves to lock the two body sections firmly together.

The two hull sections are preferably formed of sheet aluminum of a thickness of the order of 0.025 inch to 0.032 inch. Such material, including alloys of aluminium are substantially inert to saline water; and sheets of the thickness above stated are readily formed into the desired hull form. However, when the hull is of length of the order of nine feet, or longer, such thin sheet metal may not remain in close surface contact with the female container wherein it is held during the foaming operation; but the lateral pressure developed during such foaming operation due to swelling of the body volume of the foaming materials will ensure good surface engegement of the sheet metal hull with the container, so that an accurately formed hull is finally produced when the foaming operation is completed. The time interval for completion of such a foaming and "solidifying" of the porous body, is of the order of a few minutes.

Upon removing the solidified hull from the container such hull will comprise the two interlocked upper and lower sheet metal hull surfacings, together with the porous material foam formed within such surfacings, and completely filling the hull body with the exception of such holds as have been provided. These holds will extend down from the top surface or deck of the hull, preferably to the bottom surface thereof. It is now noted that such foaming materials generally do not of themselves have any adhesive quality to cause them to adhere to the surface of the sheet metal hull. Since the boat, when in use, must encounter rigorous forces acting on the exterior of the hull, and due to pounding of waves against the hull's exterior, as well as forces developed by the velocity of the boat movement through the water, it is evident that the possibiliy of shift of the sheet meal surfacing, and actual outward movement of portions of such surfacing from the porous body within the hull, must be considered and provided against. It is noted in this connection that wave forces developed as above suggested may include negative forces produced by reduction of pressures at the hull's surface by receding waves and the like. Such negative forces will tend to pull sections or areas of the sheet metal outwardly from the porous body, with corresponding possibility of damage to the sheet metal, as well as deformation of its contour. It is therefore desirable to make provision for securing the inner surface of the sheet metal hull surfacing, to the body of porous material. We have made provision for such securing either by coating the inner surface of the sheet metal units with an adhesive which will cement the porous body to the sheet metal, or by providing a physical design of the parts which will produce an interlocking of the solidified body of foamed material, with the inner surface of the sheet metal units. Such provisions are disclosed hereinafter.

Various operational as well as non-operational units are secured to the completed hull. Such units include the propeller and drive motor therefor, the prime mover, such as an electric motor and driving connections from the same to the propeller; the rudder or other course controlling unit, and the tiller or other element for directional control, and other units which will be referred to hereinafter. Such units must be held securely in place by connection to suitable portions of the hull. Since the sheet metal is desirably of small thickness to reduce its weight and also for reasons of reduction of cost, it does not have the stiffness nor other quality needed to serve as a base to which the various accessories referred to, may be secured. The foam produced body is also deficient in strength and other qualities to serve as such a base. Accordingly, we have provided reinforcing plates secured to the sheet metal hull sections, at locations suitable to serve as elements to which such accessories may be secured. These reinforcing plates may be cemented to the sheet metal hull sections by such adherents as epoxy resins, or by riveting, or otherwise.

We have referred to the production of the foam produced porous body by operations conducted in situ within the sheet metal hull surfacing. We also contemplate the production of such hull, filled at selected locations, by such porous body material otherwise than by such in situ operations. Thus, the desired hull body portions may be filled with such porous material by first producing such material exterior to the boat hull in the form of blocks which may then be set into place within the sheet metal hull, and secured in place by suitable operations. Such operations may include the pre-forming of the blocks of such material in sizes and contours to fit into various portions of the boat hull. Such pre-forming may be either by casting the various blocks in the desired sizes and contours; or by cutting such blocks out of larger blocks which have been foam produced. We contemplate as being within the scope of our present invention all such types of operation, and all such forms of the boat hulls, except as we may limit ourselves in the claims to follow.

The embodiments of boats herein illustrated and described comprise landing craft intended for military shore invasion operations against a resisting enemy. Accordingly, the herein disclosed embodiments include units especially designed and intended for use in or during such operations. Certain of such units are the following:

The craft is of size intended for accommodation of a single person, being of the order of nine feet long from bow to stern and beam of substantially thirty inches. It is provided with a flat deck surface with side rails to facilitate the crewman's operations, and to provide against side slip of such man from the deck into the water. A windshield is provided near the bow of the craft, but far enough aft to enable the man to lie prone on the deck with his head and shoulders close to such windshield and protected thereby. The steering tiller is located just behind such windshield and convenient to the man for needed steering operations. In one embodiment of the invention such tiller post also comprises a support for a machine gun which projects through a suitable opening of the windshield, such opening being of horizontal and vertical dimensions sufficient to enable the gun to be swung through needed aiming positions. The following features of construction respecting the foregoing tiller-machine-gun structure are noted.

The machine gun is supported on the tiller post in such manner that as it is rocked from side to side by manipulation of the gun stock the tiller post is correspondingly rocked for steering operations. Thus, as long as the machine gun is locked in place on the tiller post it may be used as a steering element for shifting the rudder (or the propeller unit) to produce desired changes of craft movement by steering. Thus a dual purpose is attained by such structural feature. The machine gun is, however, also removably supported to the tiller post in such manner that such gun may be unclipped from the tiller post and completely removed from such post by a quick operation produced by one hand of the man. Thus, on abandoning ship to land on the beach the man can immediately remove the machine gun and carry it to the beach ready for use against the enemy. Structural features embodying the foregoing elements and operations are fully disclosed hereinafter.

As an alternative structural feature of such tiller post construction we have also herein illustrated a convenient form of hand grip by which such tiller post may be controlled, such alternative construction not including the machine gun mount feature.

A further unit or appurtenance of military nature, or for the convenience of a gun-man, and which comprises a portion of the structural elements of the hull, comprises a mount for a repeating rifle or the like, as follows:

On either or both of the side rails at the sides of the deck, we have provided means to receive and support a gun, such as a repeating gun, lengthwise of such rail, and with full protection against water or moisture until such gun is to be removed from such supporting rail, and brought into use. To this end we have provided an elongated gun receiving bag of such material as light plastic sheeting, together with a stiff rod contained within such bag and parallel to the contained gun so that both the gun and the rod are completely enclosed by the bag. The side rail of the craft is provided with spaced apart clips which may be engaged firmly with the ends of the rod within the bag, since the bag is large enough to enclose both gun and rod in loose manner. When it may be desired to quickly remove the gun from such support such removal may be effected by jerking the gun, grasped firmly in the hand, away from the rod which remains secured to the rail by the clips, the bag being torn along its length during such removing operation, and the rod and portions of the bag remaining in position on the rail. In order to facilitate such operations the gun is preferably set onto the rail with its muzzle pointing forward and at the front of the craft. Thus, the user may conveniently grasp the gun barrel when the removal operation is to be produced. Also, the repeating gun should be secured to the rail upside down, to thus present to the rod within the bag as smooth and continuous a surface as possible, consistent with the structures of the gun, and to also cause the shell clip of the gun to project upwardly, since such clip is usually of considerable dimension normal to the axis of the gun barrel.

A further feature of the invention relates to means which we have provided to enable lashing of the landing craft to a like craft alongside, such means being of simple but effective form. Such lashing means comprises companion male and female cooperating elements on opposite sides of identical craft, so that as several of such craft are brought together, side by side, the male elements of the various craft may be engaged with the female elements of adjacent craft, such companion male and female elements being then locked together by simple operations performed by the crew-men on the successive craft.

As previously stated herein the craft herein disclosed are primarily intended for military use as landing craft, to which end they are preferably designed and formed with flat bottoms extending from their sterns to locations well forward and close to the stem of the craft. The thin sheet metal pre-prepared shell extends over such flat bottom of the craft and is thus brought directly into contact with the beach upon effecting a landing. During normal travel away from the beach such flat bottom craft may be subject to lateral slide-slip, especially when effecting a sharp turn. To reduce or prevent such side-slip we have provided fore and aft extending shallow fins along the flat bottom, such fins preferably also extending upwardly along the up-slanting fore portion of the bottom. Conveniently such fins may be produced as longitudinally extending deformations of the thin metal shell portion which comprises the craft bottom. Such deformations may be produced by or during the same sheet metal operations by which the thin sheet metal elements are formed, as by a drawing operation.

Two embodiments of the landing craft are hereinafter illustrated and described. These include an embodiment in which the steering is produced by a conventional rudder, and another embodiment in which the steering is produced by a self-contained motor driven propeller unit, which unit is journalled on an axis extending nearly vertically through the mid-line of the craft at a location relatively close to the stern of the craft. In each such embodiment suitable connections are extended lengthwise of the craft between the tiller post and the rudder or the motor-propeller unit, as the case may be, so that proper steering operations are produced. Also, each such steering embodiment—rudder or motor driven propeller unit—may be used with either the machine gun mount steering arrangement, or the conventional steering tiller arrangement, as desired.

A further feature of the invention relates to the provision of a novel form of launching unit by which one or many of the landing craft may be very quickly launched from a carrier into the water, ready for manning of such landing craft directly after such launching operation, so that the beach invasion may be commenced with least delay. Such carrier of the landing craft may be a land carrier or a water borne carrier such as a pontoon. In either case the launching devices are such that a number of the landing craft may be carried to a location close to the intended landing area (for the invasion); and such landing craft carrier is so designed, constructed and operated that all of the landing craft may be simultaneously launched by very simple operations, and in complete readiness for starting the landing operation as soon as such craft have been manned; or such launching operation may be conducted to launch the several craft one or several at a time until the carrier is relieved of all its landing craft. In either case each landing craft is releasably connected to a unit of the carrier in such way that after a simple operational movement of such unit to bring a landing craft into launching position, such releasable connection may be released to launch the craft directly into the water ready for its self-propelled and controlled water operation. We have hereinafter shown and will describe such a launching device and unit.

Other objects and uses of the invention will appear from a detailed description of the invention, which consists in the features of construction and combinations of parts hereinafter described and claimed.

In the drawings:

FIGURE 1 shows a plan view of a typical landing craft embodying features of our invention, and being of size and contour adapted for accommodation of a single man;

FIGURE 2 shows a side elevational view corresponding to FIGURE 1;

FIGURE 3 shows a front or prow end view corresponding to FIGURES 1 and 2;

FIGURE 4 shows a rear or stern end view corresponding to FIGURES 1, 2, and 3;

FIGURE 5 shows a bottom face view corresponding to FIGURES 1, 2, 3, and 4;

FIGURE 6 shows a vertical longitudinal section taken on the lines 6—6 of FIGURES 1, 3, 4, 5, 7 and 8, looking in the directions of the arrows;

FIGURE 7 shows a vertical cross-section taken on the line 7—7 of FIGURE 6, looking in the direction of the arrows; and this FIGURE 7 is a view looking into the battery hold or compartment;

FIGURE 8 shows a vertical cross-section taken on the line 8—8 of FIGURE 6, looking in the direction of the arrows; and this FIGURE 8 is a view looking into the drive motor hold or compartment;

FIGURE 9 shows a fragmentary vertical longitudinal section taken on the line 9—9 of FIGURE 1, looking in the direction of the arrows; and this figure is an enlarged side elevational view of one form of hand grip by which the tiller post is rocked for the steering function;

FIGURE 10 is a top or plan view of the unit shown in FIGURE 9;

FIGURE 11 shows a fragmentary enlarged detail section through the companion locking flanges along the proximate edges of the lower and upper thin sheet metal pre-prepared hull elements, and prior to the final interlocking of such flanges together by the lateral pressure exerted by the foaming material during the foam setting operation;

FIGURE 12 is a view corresponding to FIGURE 11; but in FIGURE 12 the companion flanges have been fully interlocked and sealed together by the lateral expansion of the foaming materials;

FIGURE 13 is an enlarged fragmentary vertical section through the proximate side portions of two of the landing craft, with the male element of the left-hand craft entered into the female element of the right-hand craft, showing how the gripping operation between the two craft is produced, a rubber or other elastic block being carried by one of the craft to engage the face of the other craft during the locking of the two craft together; being a section taken on the line 13—13 of FIGURE 14;

FIGURE 14 shows a fragmentary vertical section taken on the line 14—14 of FIGURE 13, looking in the direction of the arrows; and this FIGURE 14 shows how the locking effect may be produced under control of the man accommodated on the right-hand landing craft (in FIGURE 13);

FIGURE 15 is a fragmentary section taken on the line 15—15 of FIGURE 13, looking in the direction of the arrows;

FIGURE 16 is a vertical detailed cross-section through the tiller post of that form in which a machine gun may be secured to such tiller post and used as the means for rocking such post for the steering operations; and in FIGURE 16 the clamp block to which the machine gun is removably connected, is shown slightly above the upper end of the tiller post unit, with the machine gun clamp block and machine gun carried thereby, disconnected from the tiller post elements;

FIGURES 17 and 18 are horizontal cross-sections taken on the lines 17—17 and 18—18 respectively, of FIGURE 16, looking in the directions of the arrows;

FIGURE 19 is a fragmentary plan view of the windshield and the clamp block and machine gun carried thereby, on enlarged scale as compared with other figures; and this figure shows the machine gun opening through the windshield, and by dash-dot lines the approximate lateral limits of swing of the tiller post by use of the machine gun as a rock producing element;

FIGURE 20 shows a vertical longitudinal section taken on the line 20—20 of FIGURE 19, looking in the direction of the arrows;

FIGURE 21 is a fragmentary cross-section through a portion of one of the side walls of the sheet metal pre-prepared hull, together with the foaming produced material in contact with such hull; and this figure shows how such foam produced material may be locked to the inner surface of the sheet metal wall by use of a conventional form of angle bar secured to the sheet metal prior to the foaming operation, to lock the foam produced material to the wall;

FIGURE 22 shows a plan view looking down onto the lefthand rail of the hull element; and this figure shows the repeating gun, enclosed in its protective bag, secured in place to the top portion of the hull rail;

FIGURE 23 is a side elevation of the structure shown in FIGURE 22, and it shows in detail the clamps by which the rod inside of the bag is secured to the top portion of the rail;

FIGURE 24 shows a cross-section taken on the line 24—24 of FIGURE 23, looking in the direction of the arrows;

FIGURE 25 shows a bottom view of the craft, similar to the showing of FIGURE 5; but in this FIGURE 25 the conventional rudder has been eliminated, and the motor-driven propeller unit has been journalled through the floor of the craft body so that the direction of traction force from the propeller can be changed for steering operations; such steering operations being controlled by connections from the tiller post;

FIGURE 26 shows a longitudinal vertical section similar to the showing of FIGURE 6; but FIGURE 26 is a longitudinal section taken on the line 26—26 of FIGURE 25, looking in the direction of the arrows;

FIGURES 27 and 28 are vertical cross-sections taken on the lines 27—27 and 28—28, respectively, of FIGURES 25 and 26, looking in the directions of the arrows;

FIGURE 29 shows a vertical section through the pivotal support for the motor-driven propeller unit, being a form of construction similar to that shown in FIGURES 16, 17 and 18;

FIGURE 30 shows, schematically, a cross-section through a launching craft or barge provided with means to stow a number of the landing craft for carriage to a point convenient to the location of the intended invasion; and this figure shows one of the landing craft in its position of stowage within such barge, and another landing craft in its position ready for launching to the water surface; and FIGURE 31 shows a fragmentary plan view corresponding to the right-hand portion of the showing of FIGURE 30.

Referring to the drawings we will first describe the constructions of craft shown in FIGURES 1 to 8, inclusive, and in FIGURES 25 to 29, inclusive; and we will then describe the various accessories or appurtenances ancillary to such craft constructions, and shown in FIGURES 9 to 24, inclusive. Since the two overall craft constructions shown in FIGURES 1 to 8, inclusive, and in FIGURES 25 to 29, inclusive, are the same or similar in various respects, we shall use like parts numbers in describing these two craft embodiments, with the suffixes "a" and "b" used to refer to the two constructions, respectively.

The craft shown in FIGURES 1 to 8, and in FIGURES 25 to 29, includes a flat-bottom hull of shallow draft, and rather large beam to length ratio. Such craft includes the lower and upper hull sections of pre-prepared outer surfacing or skin, 50 and 51, which when brought together define the outer perimeter surfaces of the hull. Each of these hull sections conveniently comprises a thin sheet of metal such as aluminium or aluminium alloy drawn into the form indicated in the figures. Such forms are well shown in the cross-section of FIGURES 7 and 8, and 27 and 28, for the two craft embodiments. In the case of craft having an overall length of substantially 9 feet and a beam of substantially 30 inches, such hull sheets may be of thickness of the order of 0.025 to 0.032 inch aluminium or its alloy. It is evident that hulls of such thin sheet metal would seriously lack in strength and stiffness to stand operational conditions encountered when driving the craft at speed, and when encountering expected wave and other water conditions. However, the hull containing porous, non-permeable, low specific gravity material, already referred to, and which will be further considered hereinafter, possesses inherent qualities of compressive strength and otherwise which act to lend the required stiffness and overall strength to the hull, to enable the completed craft to encounter and successfully resist all normally to-be-expected battering and other sea-borne forces and conditions. Such porous, non-permeable material is included in the hull in such forms and conditions of placement, that the outer thin sheet metal surfacing acts primarily as such a surfacing for protection of the body or bodies of porous, non-permeable material, and such that such body or bodies of such porous material serve to impart to the completed hull the needed stiffness and overall strength to enable such hull to resist the forces to which it will be subjected, without serious damage to the contour of such hull. It is also here to be noted, that even serious damage to the metal surfacing, such as would produce leaking, or other condition, does not impair the buoyancy of the craft to any material degree, since, as already explained, such porous, non-permeable material contains a myriad of small self-sealed pores, each filled with gas, and only a small percent of such pores might be broken to admit water, at any given time, or under any stated condition of casualty.

For purposes of convenience of illustration, and to emphasize the relation of the porous body material sections, to the outer sheet metal skin, we have indicated all such porous non-permeable material by the stippling in various figures. Such indications are found especially in FIGURES 6, 7, 8, 9, 12, 21, 26, 27 and 28. Comparison of various of such figures shows that such porous material extends completely from prow to stern of the craft, and completely between the two sides of the craft at several locations, although the open space holds 52 and 53 are also provided in the body of porous material. These holds are provided to accommodate the source of energy for driving the craft (in the present embodiments, such source being storage batteries, shown at 54 in the hold 52); (and the hold 53 being for accommodation of the motor by which the propeller is driven, as shown in FIGURES 6 and 8, or for accommodation of a portion of the motor-propeller unit and its steering controls, as shown in FIGURES 26 and 27). Thus, such porous material completely fills the forward portion of the sheet metal shell, as shown at 55 in FIGURES 6 and 26, such material completely extends across the hull from side to side between the two holds 52 and 53, as shown at 56 in said figures, and such material also completely fills the stern portion of the craft, as shown at 57 in said figures. Examination of FIGURES 7 and 8, and FIGURES 28 and 27, also shows that such porous material extends along the starboard and port sides of each illustrated craft, past the holds, and serves to connect together the porous material bodies already referred to, such fore and aft porous sections being shown at 58 and 59, and 60 and 61, respectively, in said figures. Thus, such porous, non-permeable material completely protects all surfaces of the hull defined by the sheet metal surfacing, and provides a continuous filling of both the prow and stern portions of the hull, as well as extending across the hull between the two holds, to produce lateral stiffness in the central portion of the craft.

It is here noted that in FIGURE 9 we have shown an alternative fragmentary embodiment of that portion of the hull at which the steering tiller post is located, in which alternative construction such tiller post is received within a further small hold 62, which small hold is also defined by the dashed lines correspondingly numbered in FIGURES 1, 5 and 25. In such alternative construction, however, such porous material also extends past both sides of such hold 62, and along the inside faces of both sides of the hull.

It is now apparent that the hull comprises a substantially solid mass of such porous, non-permeable, low specific gravity material, with the exception of the hold spaces; and it is also apparent that great strength and rigidity of the hull is produced by such mass of such material, and that all surfaces of the exterior thin sheet metal enclosure are given protection by such body of material against crushing or like forces exerted against the exterior of the hull. Since forces of shear may also be produced on the exterior surface of the hull, tending to shift such thin metal sheet along the hull, or upwardly or downwardly, and since forces of suction may also be produced against the outside surface of such sheet metal surfacing of the hull, it is desirable to provide means to retain such sheet metal firmly against the porous material. Such result may be produced in various manners, including cementing the porous material to the sheet metal, as by use of a coating of epoxy resin applied to the surface of the sheet metal prior to introduction of the porous material into the formed sheet metal units, or by mechanical junction between the sheet metal and the porous material of solid form. When the porous material body is formed in situ, as by bringing the proper components together by a double nozzle introduction into the space within the sheet metal hull, the foaming material will flow laterally and endwise of the hull sheet metal unit, to produce a substantially complete filling of all spaces which communicate with the location of such nozzle. Accordingly, such foaming material will engage with substantially all of the inner surfaces of the sheet metal hull unit. Thus, by coating such surfaces with a suitable adherent prior to production of the foaming operation, the desired adherence between the body of the porous material (when set) and the sheet metal, will be produced.

Alternately, mechanical elements may be provided for locking the foaming bodies (when set) to the sheet metal. In FIGURE 21 we have shown one such mechanical locking element type. The locking element there shown comprises a strip or length of special section angle bar 63 formed with one of its legs 64 of conventional section and secured to the inside surface of the sheet metal body, as by riveting or otherwise; the other leg of such section being provided with an enlarged edge portion 65 around which the foaming material will flow while still semi-fluid or plastic. Then, when such foaming material sets into solid condition such enlarged angle portion 65 will be locked firmly into the body of the foam produced material. Strips such as shown in this figure may be extended along the inner surfaces of both sides of the sheet metal hull as shown, for example, in FIGURE 6.

Prior to producing the foaming operation to form the foam produced material in situ within the hull, the lower and upper body section of the thin sheet metal are set together, the one on the other, and with their edges in partial engagement with each other. Reference is now made to FIGURES 11 and 12 which show enlarged fragmentary sections through such proximate edge portions. The side walls of the bottom section 50 are bent inwardly and downwardly of the section, to produce the longitudinally extending narrow downwardly facing groove 66 of width slightly larger than the thickness of the sheet metal of the upper section 51; and likewise the side walls of the top section 51 are bent outwardly and upwardly of such section 51, to produce the longitudinally extending narrow upwardly facing groove 67 of width slightly larger than the thickness of the sheet metal of the lower section 50. Like flanged portions and grooves may also be formed in the stern end portions of the two hull sections. The top and bottom sheet metal hull sections are then set into edge relationship such as shown in FIGURE 11, by pressing the upper section downwardly to force its flanged and grooved edge slightly past the flanged and grooved edge portions of the lower section, so that the flanged and grooved edge portions of the two sections come into such relationship as shown in such FIGURE 11. It is evident that, having brought such two sections 50 and 51 into such relationship, a slight vertical movement of one section, 50 or 51, with relation to the other section, will serve to lock the flanged portions of the two sections into the companion grooved portions of opposite sections.

Having thus locked the two boat sections of sheet metal together, the outer perimetrical surfaces of the hull are defined by such sheet metal elements, including the bottom, the sides, the stern and the deck of such craft; and thus a fairly fluid tight enclosure is produced within which the foaming and filling operations may be produced. Suitable openings are provided in the deck (or elsewhere), as shown at 68, 69 and 70 in FIGURES 1 and 25 (it being understood that FIGURE 25 is a bottom view, and that such openings 68$^b$, 69$^b$ and 70$^b$ are actually provided in the deck of the hull embodiment shown in such FIGURE 25). These openings are of size to accommodate the double nozzle of the foam producing elements (through one of such openings), and to permit exit of air and chemically developed and released gas (through another such opening). When the length of the craft is such as to make it desirable to introduce part of the foaming materials through one opening, and part through another opening, to ensure good and even distribution of the foamed material throughout the length of such craft; in such case the two openings 68 and 70 may be used for introduction of the foaming materials, and the central opening 69 may be used for exit of air and gases.

During the foaming and setting operations of the chemical ingredients, to the solid state of the porous, non-permeable body, there occurs a slight expansion of the body of such material prior to the final setting thereof. This expansion occurs in all directions, according to the laws defining transmission of forces through a liquid or semi-liquid body. Accordingly, pressure is exerted laterally against the lower edge portions of the upper metal shell (see FIGURE 11) to force such edge portions rightward (in FIGURE 11) into the general configuration shown in FIGURE 12, with tight locking of the proximate edge portions of the upper and lower sheet metal elements together. The outward forces developed against the hull sections 50 and 51 by such lateral forces of expansion are resisted by the outside female container 164 within which the hull is seated during the foaming operations. Such female container is shown schematically in FIGURES 7 and 8 by such cross hatching 164. The locking occurs prior to the final setting of the coacting chemicals into the "solid" state condition of porosity and non-permeability. Thus the upper and lower craft shell sections are securely and permanently locked together along their common seam.

Such expansion during the "solidifying" operation will also result in some pressure release upwardly through the several openings 68, 69 and 70, in the deck with corresponding production of an extruded plug through each such opening, such openings acting as sprues through which such plugs are protruded. Such plugs may then be cut off, and suitable sheet metal covers provided for the openings.

It may also be desirable, in order to produce good water-tight and physically strong seals between the thus folded together edge portions of the lower and upper sections, 50 and 51, to paint such edge portions with a suitable metal cement just prior to the foaming operation, epoxy resins being suitable for such cementing between the companion metal surfaces, and also due to the fact that destruction of such seals along such portions would entail delivery of shear forces between the two parts.

It is here noted, however, that even should the water tightness of the seals between the lower and upper sections, 50 and 51, be impaired or destroyed, water which might then leak into the hull of the craft could not seriously impair the buoyancy of such craft, since the non-permeability of the foam produced material would not thereby be impaired or destroyed, except at small areas directly contiguous to such positions of leakage.

In order to prevent intrusion of the foaming material into the several holds 52 and 53 (and possibly also 62), suitable means may be provided to prevent such intrusion. Thus, in various figures we have shown the vertical enclosing partitions 71 and 72 (and 73) surrounding the several holds, for the full heights thereof from the hull's bottom upwards. These partitions may be formed of thin sheet metal, such as the aluminium or one of its alloys, and constitute permanent portions of the finished hull. Otherwise, instead of providing such permanent partitions, use may be made of plugs of wood or metal or plastic, of proper size and contour, and depth set temporarily down through openings of the deck to seat against the hull bottom; each such plug corresponding in size and contour to the to-be-produced hold space. When the foaming materials do not adhere to such plugs, the plugs may be readily withdrawn after the setting and solidifying action has been completed. Such non-adherence will be characteristic of such materials as wood and most metals; but in other cases, suitable materials may be coated onto the plugs prior to the production of the foaming operations, to prevent adherence.

Due to the small beam of the craft (when it comprises a single man landing craft), it is desirable to provide side rails or the like to aid the user of the craft in his resistance against lateral slide from the flat deck of the craft. To this end we have shown the side rails 74 and 75 extending along both sides of the deck from the craft's stern, to points close to the windshield, presently to be described. Each of these rails extends up from the surface of the deck about two (or several) inches, far enough for the crewman to grasp the same, and in any case, to aid him in retaining his position, prone, on the deck surface. These rails are produced by production of corresponding deformations of the thin sheet metal of the upper hull section, 51 when such hull section is produced; and during the foaming and subsequent solidifying operations, such deformations will be well filled with the foamed material. The solid nature of such porous, non-permeable material will give to such rails the stiffness and strength desired for them to meet their intended purposes. Examination of FIGURES 22, 23 and 24 shows a rod or bar 76 extending substantially the full length of the rail therein illustrated. Such rod or bar is located close to or at the surface of the thin sheet metal which comprises a portion of the upper hull section 51. It serves as a reinforcement to which certain appurtenances of equipment of the landing craft are or may be secured, as will be hereinafter described. Other reinforcements included in the hull sections will be referred to hereinafter, as various elements or units of equipment are described, including the provisions for craft drive and steering.

Referring to the embodiment shown in FIGURES 1 to 8, inclusive, in this case the propeller 77 is carried by the shaft 78 journalled in a unit 79–80 secured to the bottom of the craft. Such propeller unit shaft extends forwardly and upwardly on a slant of substantially 4 degrees, to bring the front end of the shaft substantially to the floor of the hull. The unit is formed to provide a shaft enclosure with packed water-proof bearing 81 at the location where the shaft enters such enclosure, such enclosure connecting with an opening 82 communicating with the drive motor hold 53. The drive motor 83 is mounted on the floor of the hull (specifically, on a reinforcement plate carried by such floor). A hatch 84 is removably seated onto a frame 85 secured to the deck of the hull (specifically, to a reinforcement plate carried by such deck). The motor and its accessories may thus be readily reached by removal of the hatch. The drive shaft of the motor 86, carries a gear 87 which meshes with the pinion 88 carried by the forward end of the propeller shaft. Thus drive produced by the motor is communicated to the propeller.

The batteries 54 are mounted on the floor of the hold 52, being conveniently retained against endwise or lateral shift by suitable barriers 90 seated on the floor around the lower portions of such batteries. The hatch 91 is provided for giving access to such batteries, such hatch being seated into the frame 92 carried by the deck of the hull (specifically, to a reinforcement plate carried by such deck). Suitable connections and controls (not shown) are provided for supply of current to the motor from the batteries, at such propeller speeds as may be desired.

In the presently being described embodiment a rudder 93 is provided for steering the craft. This rudder is carried by the shaft 94 journalled in the element 95 secured to the stern of the craft (with proper reinforcement plate provision therefore). The shaft may be rocked back and forth for the steering functions, by lines connected to the two arms 96 and 97. Such lines are shown at 98 and 99 extending forwardly through the body of the hull to the tiller post forward. This tiller post 100 is journalled in the deck (or a reinforcement plate thereof) and in a block 101 secured to the bottom of the craft (or to a reinforcement plate). The arms 102 and 103 are connected to the tiller post and extend laterally at both sides thereof, as shown in FIGURES 1 and 5. The forward ends of the lines 98 and 99 are connected to such arms. The hand grip element, shown as circular in form, is connected to the upper end of the tiller post at a location slightly above the deck surface, for convenient grasp by the crew-man lying prone on the deck of the craft.

The curved windshield 104 is mounted to the deck (or to a reinforcement thereof) just in front of such tiller post hand grip. Such windshiled is shown as slanting backward and upward to a height sufficient to afford good protection to the crew-man, it being noted that such windshield is formed of transparent, substantially bullet resisting material such as plastic. In case of impact of a projectile against such slanting windshield there will be produced a sharp and large torque acting to tilt the windshield (seen as in FIGURES 2 and 6), tending to rock the windshield counterclockwise about a line drawn across the craft at the location of the rear lower corners of such windshield. To resist such torque and such tilting we have shown the retaining band 105 extending around and in engagement with the lower edge portion of the windshield. Such band is firmly secured to the deck of the craft against rise from such deck. Since the torque developed by the projectile impact against the windshield tends to rock such windshield about its rear corners 106 it follows that the front edge of the windshield must rise; but due to the slanting form such rise is resisted by the presence of such band 105.

In FIGURE 20 we have shown an alternative form of support for such lower windshield edge, as follows:

A metal strip 107 extends around and is secured to the deck surface at the location of the lower windshield edge. This strip comprises a stiff metal band formed of curvature to match the windshield curvature and flat surface for firm attachment to the deck of the craft; and such band is provided with the upwardly extending folded rib 108 which slants rearwardly and upwardly, as shown in FIGURE 20 to set firmly against the lower front edge of the windshield. This band supports another angle shaped curved element 109 which extends up into a curved recessed rear edge of the windshield, 110 snugly, so that its top edge, together with the top edge of the rib 108 grip the recessed rear edge and the opposite front edge, of the windshield between them. Accordingly the lower edge of the windshield cannot rise away from the surface of the deck without forcing the rib 108 and the element 109 apart.

In FIGURES 16, 17 and 18 we have shown, more or less schematically, a tiller post by which the lines 98 and 99 to the rudder (or to the motor-propeller unit, presently to be described) are controlled for the steering operations, when such tiller post also serves the function of supporting the machine gun, which gun may then also serve as the means for rocking such tiller post for the steering function. Such tiller post is shown as supported by the deck of the craft, such deck being indicated at 111, and including the thin metal sheet of the top hull section 51, together with a reinforcing sheet of such metal as stainless steel 112 rivited or cemented to the sheet 111. Such sheet 112 conveniently extends substantially the full width of the craft and rearwardly from the windshield location to embrace the hatch frame 92, already referred to. Thus such sheet 112 is of area sufficient to be rigidly supported to the deck, and thus to the upper hull section. This sheet will be referred to later herein.

The deck, including such sheet 112 is provided with an opening 113 through which extends a bearing element by which the tiller post is rockingly supported by the deck and such reinforcing sheet 112. Such bearing element includes the upper and lower companion elements 114 and 115, conveniently of circular form. These elements or one of them, extend partially through such opening 113, and they are drawn together by a through bolt 116, headed on its lower end, and receiving a nut 117 on its upper end—that is, above the surface of the deck. Such nut is thus accessible for adjusting its tension to secure such adjustment between the two sections 114 and 115 as desired to ensure free rotation of the tiller post, without needless free play thereof. The element or section 115 is provided with a downwardly extending neck 118, having the two outwardly extending arms 103 and 102 to which reference has already been made. These are the arms to which the lines 99 and 98 connect for the steering functions.

The elements 114 and 115 are oppositely recessed around their peripheries to receive rings 119 and 120 respectively. These rings may be cemented to their respective elements, or they may be of tight fit into their respective recesses to retain them in place. The circular edge of the opening 113 in the sheet 112 is slightly reduced in thickness to receive an encircling U-section band 121 which is engaged by the rings 119 and 120. By adjustment of the nut 117 such engagement between such rings and band is brought to a nice bearing condition, allowing freedom of rotation of the tiller post.

It is now noted that since the elements, including such bearing surfaces are open to the effects of any moisture, and including saline sea-water, that may wash onto the deck, such bearing surfaces will be subject to the deleterious effects of such sea-water among other elements. Preferably the rings 119 and 120 are formed of bronze and the band 121 is preferably formed of stainless steel, such materials acting together to produce good bearing surfaces, and since such materials have but small electrolytic potentials such bearing will suffer but little from sea-water effects.

The element 118 extends partially through the deck thickness and close to the undersurface of the element 114. The locating pins 122 extend between such elements 118 and 114 to transmit steering torques from such element 114 to the element 118, and thus to the arms 102 and 103. The block 123 is carried by and connected to the four die springs 124 located at the corners of a square as shown in FIGURES 17 and 18, the lower ends of such springs being secured to the element 114. Thus such block is well supported by the element 114, but may be flexed in various directions while maintaining rotary driving connection to such element 114. The block 125, shown in FIGURE 16 as above and disconnected from such block 123, is recessed downwardly to receive a convenient element of a machine gun set down into such recess 126, and a cover plate 127 is hinged to the block 125 by the hinge 128. By raising such cover plate the recess 126 is top opened to receive the machine gun (shown as the cross-hatching in FIGURE 16, at 129), or to permit removal of such gun from the block 125. Thus, such block 125 may be assembled to the gun when such block is disconnected from the block 123, and such block 125 may be attached to or disconnected from the machine gun, as desired. A suitable clip 130 is provided for retaining the cover 127 in its closed position.

The blocks 123 and 125 are provided with companion elements to ensure angular drive of the tiller post by swing of the gun laterally in either direction. Such means comprises the companion cross-groove 131 and rib 132 provided in the proximate faces of the two blocks 123 and 125, respectively. Thus, by setting block 125 into place on the block 123 with the rib engaged with the groove, the desired driving connection referred to above is effected. Suitable clips 133 and 134 may be snap engaged with companion hooks 135 and 136 to lock the block 125 carrying the gun, in engaged condition to the tiller post.

In FIGURES 19 and 20 we have shown such tiller-post-machine-gun assembly in its relation to the windshield 104. Such windsheld is provided with the rectangular opening 137 through which the gun 129 projects, with the gun stock, shell clip, trigger, and other operating elements of the gun located behind the block 125 and thus behind the windshield, within convenient reach of the crew-man, lying prone on the deck. Such opening 137 is of lateral angular dimension to permit lateral swings of the gun between the limits shown by the lines 138 and 139 (FIGURE 19), and is of vertical dimension to permit vertical swings between the lines 140 and 141. During such vertical swings the springs 124 permit rock of the blocks and the gun about a pivotal point such as shown at 142 in FIGURE 20, the gun bore swinging substantially on the circular arc 143 shown in such figure. By such operational combination of the machine gun with the tiller post the gun aiming is coordinated with the steering operation, so that as a turning operation is conducted, the gun is at the same time rocked to produce aim towards targets at which the steering operation is swinging the craft.

Referring next to FIGURES 13, 14 and 15, we have therein shown a simple, fast operating arrangement for attaching two craft together side to side. This arrangement includes a female element provided at one side of a craft and a male element companion thereto, provided on such craft at a position generally directly opposite to such female element; such female and male elements being of cooperating nature so that two such so-equipped craft, when brought together with the male element of one craft in registry with the female element of another such craft the male and female elements of such two craft may be readily locked together by a simple pulling operation produced by the crew-man carried on the craft carrying the female element in question. The structure shown in the drawings is as follows:

In FIGURE 13 the craft "A" is provided with the outwardly projecting probe 144. Such probe includes the shank 145 having the enlarged, generally spherical head portion 146. The shank is long enough so that when two such crafts are brought into side contact such probe will project into the confines of such companion craft. As show in FIGURE 13 the craft "B" is in such lateral contact with craft "A." Such craft "B" is provided with the companion female element comprising a pair of oppositely spiralled strong but flexible gripping wires 147 and 148 which are so woven together that a meshwork is produced, with the first ends of both wires located at one end of the mesh, and the second ends of both wires located at the opposite end of the mesh, the wires criss-crossing each other numerous times in a network, open at the first defined end, and closed or substantially closed at the second defined end. Means are provided for anchoring the first defined ends stationary to an element of the craft "B," and for drawing the second defined ends of such wires away from such so-anchored ends by a simple manipulation effected by the crew-man on the craft "B." Assuming that such pulling or drawing operation has not been performed, and that the second defined ends of the mesh wires are closest possible to the anchored wire ends, such mesh will be expanded radially to its maximum dimension. Then, by pulling on the second defined wire ends the dimension of such radius will be progressively reduced, with corresponding grip effected on an object which was inserted into the body of the mesh at the anchored end wire position.

Thus, in the embodiment shown in FIGURE 13, the second defined ends of the wires are brought together at 149, and connected to a tension line 150; and the first defined ends of such wires are connected to a ring 151 which is locked against rightward movement in FIGURE 13 by suitable means. In the embodiment shown, such locking of the ring is produced by the flange 152 of a shell or capsule 153, or a ring 154 which engages the left-hand flange of such capsule, which ring is secured to the side of the craft "B." The side of such craft "B" is provided with an opening co-axial with such wire mesh element, and with such capsule and anchoring devices, so that the male element carried by craft "A" may be entered into the capsule as the two craft come together, side by side. Such so-entered together condition is shown in FIGURE 13; and in that figure not only has the male element been entered into the female element, but the wire mesh is also shown as shown tightly onto the surface of the male element, both on the spherical head portion of the probe, and also onto the shank thereof. Prior to such pulling operation the wire mesh was expanded by collapse of the wire ends 149 leftwardly towards the anchored location. The left-hand end of the capsule 153 is also anchored to the side of craft "B," and the side of such craft "B" is provided with an opening of size the same as the inside of such capsule. Accordingly, the probe carried by craft "A" may be entered through such opening and into the capsule of craft "B" and into the relaxed and expanded diameter wire mesh. Such condition is attained just prior to actual side contact of the two craft together. Having thus brought the probe carried by craft "A" into the wire mesh, the crew-man of craft "B" may pull on the line 150, thus tightening the mesh around and onto the probe, and especially ensuring good engagement of such tightened mesh with the left-hand, reduced diameter portion of the probe, its shank.

Conveniently the line 150 is brought through the deck to a location convenient for manipulation by the crew-man of the craft "B." Accordingly, such line is carried under a stud 155 extended forwardly of the craft, and then upwardly through the opening 156 in the deck, and is provided with a ring 157 by which such line is conveniently pulled. Having pulled the line taut to set the wire mesh tightly on the probe, such ring may be set over a hook 158 to lock the line against retraction. The following operational condition is also important in such type of gripping unit:

When some pull has been produced on the line 150 so that the wire mesh has been brought into frictional engagement with the probe of the craft "A," any tendency for such craft "A" to move away from craft "B" will serve to draw the wire mesh tighter onto the probe; and the stronger the tendency for the two craft to depart from each other, the stronger will be the gripping effect of the wire mesh exerted on the probe. Thus the gripping effect will be cumulative. By anchoring the ring in taut condition as previously explained, there is assurance that gripping of the mesh onto the probe will be started; and then any tendency for the craft to depart from each other will magnify the gripping tendency.

The probe shank 145 conveniently comprises a portion of a unit which includes the flange 159 set against the inner surface of the craft "A" and secured in position by cement or riveting or otherwise, with the shank extended through an opening in the side wall of the craft "A." Preferably a gasket 160 of elastic material such as rubber is set onto the shank of the probe outside of the craft "A." Such gasket constitutes a bumper element to be engaged by the side of craft "B" prior to actual contact of the two craft together, and serves to perform conventional purposes of such bumpers on craft.

Examination of FIGURE 13 shows the presence of a fully collapsed spring 160 in the line 150. This spring can yield when an excessive tension may be developed in such line, due to excessive tendency of the two craft to move apart, and thus prevent breakage of the line 150.

Conveniently the stud 155 beneath which the line 150 extends, is secured to a post 161 extending vertically from the bottom of the craft (or from a reinforcement plate thereon), to the reinforcement plate 112 of the deck. Such post 161 comprises one of the pair 161 and 162 located at opposite sides of the craft just ahead of the front edges of the hold 52. It is here noted that the steering lines 98 and 99 extend past the sides of such hold 52 and around such posts, to the tiller post arms 102 and 103. Due to the width of such hold 52 it is necessary to provide for change of direction of the tiller lines in order to reach such arms 102 and 103; and such changes of direction are produced by such posts. Such posts are numbered with the suffixes "a" and "b" for the embodiments of FIGURES 1 to 5, inclusive, and of FIGURES 25 to 28, inclusive, respectively. The reinforcing plate for the hull bottom is numbered 163$^a$ or 163$^b$ for the two embodiments, as the case may be.

It is noted that such lashing units for connecting two of the craft together may be used for production of a continuing series of the craft, lashed together side by side, to any number of such craft, thus producing a continuous deck area extending across the decks of the numerous craft in succession. Such an arrangement might be produced, for example, in the case of desire to quickly assemble a "pontoon bridge" across a natural obstruction, such as a creek or other stream.

Examination of FIGURES 1, 2, 5, 6, and others, shows the presence of such lashing elements near both the front and the stern ends of the several craft. By using both such units the successive craft are well connected to prevent tendency to swing one craft about the other due to such forces as may be developed against such craft.

In FIGURES 1 and 5 to 9 and 25, 26, 27 and 28, we have shown a steering post construction of a type different from that shown in FIGURES 15, 16, 17, 19 and 20. Such different form of the steering construction is shown in detail in FIGURE 10, and is as follows:

The post 100, already referred to, and journalled in the deck, and also in a block 101, is provided with the circular hand grip 165 a short distance above the deck, and just behind the windshield, convenient of manipulation by the crew-man during various operations. It will be noted especially from FIGURES 1, 6 and 26 that such hand grip is concave towards the new-man; and also that its convexity faces towards the curved windshield. Thus, it is possible to locate the tiller post 100 close to the windshield and in a location such that a maximum of windshield protection is afforded to the crew-man from hostile gunfire.

The arms 102 and 103 to which the lines 98 and 99 are connected, are secured to the post about midway of its height in the hull. Examination of FIGURES 1, 6, 9 and 10 shows the cross-wise extending bar 166 carried by and secured to the tiller post somewhat above the location of the arms 102 and 103. Thus such bar 166 rocks back and forth from its central position (shown in FIGURE 10 and elsewhere), with rocks of the tiller post. A vertical bar 167 is set a short distance behind the tiller post, being secured in such position by connections to the deck reinforcing plate 112, and to the hull bottom reinforcing plate 163, respectively. The stiff leaf spring 168 is secured to such bar 167 and its two arms extend rightwardly and leftwardly into engagement with the arms 169 and 170, respectively, of the bar 166. By this arrangement such leaf spring at all times urges the tiller post to return to its central position, corresponding return of the rudder (or the motor-drive-propeller unit) (see FIGURES 25 to 29, inclusive), to its central steering position. The bar 170$^c$ is set directly in front of the center of such leaf spring to reinforce it at such point.

Reference to FIGURES 1, 2, 3, 4, 5, 6, 7 and 8, of one embodiment, and to FIGURES 25, 26, 27 and 28 of the other embodiment, show the presence of the longitudinally extending shallow fins 171 on the bottom of each such embodiment, such fins being carried forward far enough to underlie the upwardly slanting bow portion of the craft. Such fins are numbered 171$^a$ for the first embodiment, and 171$^b$ for the second embodiment. these fins act to resist side-slip of the craft, especially when executing sharp turns.

Examination of the above illustrated fins shows that the fins shown in embodiment "a" comprise lengths of bar of angle section, with outwardly extending flanges lying in a common plane and with such flanges secured flat to the underside of the thin sheet metal of the hull section 50$^a$. On the contrary, the fins of the embodiment "b" comprise angle ribs formed directly in the sheet metal of the hull section 50$^b$ during the forming operations to which such hull section is subjected.

Examination of FIGURES 1, 2 and 3 will show the short fins 172 extending outwardly from the sides of the front or bow portion of the lower hull section 50$^a$. These fins will give the craft added stability during its course through the water.

Examination of FIGURES 2, 5 and 6 will show the presence of the vertical keel fin 173$^a$ at about the midpoint of the embodiment "a," and in advance of the propeller unit. This fin will also give added stability to the craft under way.

Reference is next made to FIGURES 22, 23 and 24 which show enlarged views of the left-hand rail of the craft, having thereon provision for carrying a repeating rifle, or other weapon in manner convenient for quick grasp by the crew-man, and quick release from such craft rail, preparatory to quick use of such weapon by the crew-man. This arrangement is as follows:

A stiffening bar or rod 174 is embedded in the upper portion of the rib or rail in question, so that it will be held securely in place by the foamed material extending up into and filling such rail (see FIGURES 13 and elsewhere). Threaded studs 175 and 176, secured to such bar 174, extend up through the thin metal sheeting to threading positions above the rail. Z-bar clips 177 are set onto such studs, and wing nuts 178 are threaded onto the studs to secure such clips firmly in place. The gun or other weapon is set into a flexible bag 179$^a$ of such material as thin plastic or the like, waterproof and tough, such bag being oversize for the contained weapon so that such weapon can be readily grasped through the bag when the occasion arrives for use of the weapon. Such weapon is schematically shown at 179 as a repeating rifle; and, as shown in FIGURE 23 in particular, it is set onto the rail muzzle forward. A rather stiff rod or bar 180 is also set lengthwise in the bag. Such rod is somewhat longer than the weapon and the bag is of corresponding length, so that when the bag is closed water-tight such rod is also accommodated within the bag. Such rod is of length to be received beneath the Z-bar clip at each end of the weapon, as shown in FIGURE 23, so that by clamping the clips firmly down onto the projecting portions of the rod 180 (and the intervening bag portions), both the rod and the bag are firmly gripped to the rail bar 174. The firmness of such grip is sufficient to retain such rod and portions of the bag in place when, on emergency the crew-man jerks the gun and the loose bag away from the rail for use of the gun or other weapon.

The companion clip pairs 181 and 182 are provided for retaining the gun properly in place, additionally to the tear-away rod or bar 180. Each of such clip pairs includes a finger 183ª which is secured stationary to the rod or bar 174, together with a companion clip pivoted to such stationary clip so that by swinging such pivoted clip to separate the free ends of the clips the bag contained gun may be set into place between the clips as shown in FIGURES 22, 23 and 24. Convenient, preferably elastic, means 183ᵇ are provided for retaining the clips in engagement with the gun and bag after the latter have been set into place between the clips. When the emergency arises requiring removal of the gun and bag, such elastic units may be forced off from the free ends of the clips, freeing the gun and bag for jerking removal from the bar 180, which remain firmly locked to the clips 177. Such so-released gun and bag may then be quickly brought into action, without need of removing the torn bag from the gun, since such gun may be fired through the bag.

Examination of FIGURE 23 shows that the stationary clip of the pair of clips there shown, extends upwardly at the inside or craft side of the unit, so that lateral pressures exerted against the gun and bag by wind and waves arriving at the craft will not displace the gun and bag from proper engagement with such clip pairs. Such displacement will, however, be produced by a normal swing of the crew-man's arm for purposeful removal of the gun as intended.

It remains next to make reference to FIGURES 25, 26, 27, 28 and 29, illustrating embodiment "b," wherein the rudder is dispersed with, and wherein the motor-driven propeller unit is journalled for rock about a vertical (or nearly vertical) axis extending through the central fore and aft plane of the hull, to produce the desired steering, as well as supplying the motive-power to drive the craft. Reference is thus made to such figures, as follows:

A streamlined housing 183 encloses the drive motor of which the shaft 184 carries the propeller 185. Extending up from the housing 183 is the stem 186 which is journalled to the bottom of the craft (or to a reinforcing plate 163ᵇ, as shown in FIGURE 26). Since it is desirable to so support the propeller shaft that it extends at a slight forward and upward slant, such journalling is so effected as to produce the angle of substantially 4 degrees between the craft's bottom and such shaft, as shown in FIGURE 26. Reference is made to FIGURE 29 to show the construction of the journalling of the stem 186 to the craft's bottom, as follows:

The stem 186 is provided with a flange 187 below the craft's bottom 50ᵇ, and the stem proper extends up through the opening 113ᵇ in the bottom of the craft, into the hold 53ᵇ which is substituted for the hold 53ª of the embodiment "A." The sleeve 188 is set down onto such upper portion of the stem 186; and a nut 189 is threaded onto the upper end of the stem to retain the sleeve in desired vertical adjustment, as presently appearing. The flange 190 is provided on such sleeve 188, extending outwarly over the bottom of the craft 50ᵇ, so that both of the flanges grip such bottom 50ᵇ between them. The rings 191 and 192 are set into slightly shouldered circular recesses provided in the flanges 187 and 190 and such rings are held in place by cementing or otherwise, or by tight fitting, as desired. The U-shaped element 193 is seated onto the inner edge of the circular opening 113ᵇ of the reinforcement plate 50ᵇ, thus corresponding to the journalling structure described in detail in connection with the structure shown in FIGURES 16, 17 and 18. By proper adjustment of the nut 189 the two flanges with their rings 191 and 192 are brought into good running engagement with the U-shaped element, with elimination of needless play between the parts. The sleeve 188 carries the oppositely extending arms 194 and 195 to which the steering lines 196 and 197 are connected, such lines extending from the arms 194 and 195 to the arms 102ᵇ and 103ᵇ on the steering or tiller post 100ᵇ. Thus the rocking of the tiller post swings the propeller axis in one direction or the other as desired for changing the direction of propulsion, and thus the direction of the craft; it being noted that the axis on which such swing is effected is well back of the center of such craft.

The stem 188 is provided with the through bore 198 whose lower end communicates with the interior of the motor housing. The electric lines for supply of current to the motor are run through such bore from their points of connection to the current supply and control units (not shown).

The lines between the tiller post and the rudder arms 96 and 97, or between such tiller post and the motor enclosing motor control arms 194 and 195 extend through the body of the foam produced material as is evident from examination of various figures. Such lines should be set into place and connected to the proper arms prior to the foaming operation, in which case the lines will be enclosed by the porous non-permeable material when the same has set. However, since such porous non-permeable material has substantially no adhesive quality the lines can be readily drawn back and forth by proper tiller post rockings, to effect such loosening of the lines as may be needful. It is also noted that in the embodiments shown in FIGURES 6 and 26 the tiller posts and the arms connected thereto, are embedded directly in such porous material. Usually such arms can be made to cut paths through such porous material after the setting operation has been completed, by rocking the tiller posts back and forth; otherwise the tiller post and such arms may be contained in such a special hold as shown in FIGURE 9 at 62.

Although the rifle carrying unit shown in FIGURES 22, 23 and 24 is there shown on the left-hand rail of the craft (for convenience in illustration), still such unit may, if desired, be placed on the right-hand rail for convenient grasp by the right-hand of the crew-man.

Provision is made for charging the battery of the craft in convenient manner. To this end such craft is provided with the conventional electrical socket 199 (see FIGURE 2) having its terminals connected to the battery so that temporary connection of such battery to the source of charging current may be readily effected in simple manner.

The holds 52ª and 52ᵇ which accommodate the batteries are shown by the cross-hatching in FIGURES 6, 7 and 8 (for the "A" embodiment), and by the cross-hatching in FIGURES 26, 27 and 28 (for the "B" embodiment), to be filled with material 200 around the several batteries. Such material should be of self-sealing quality so that in case of damage to a battery, as by gun-shot, gases or electrolyte released from the battery box will not gain access to other parts of the craft, nor be released to annoy or poison the crew-man. Conveniently such material may comprise sheets of rubber of proper characteristics, or a bag or box of such material set into place over or around each battery when it is in place in its hold.

If desired a fin such as shown at 201 in FIGURES 25 and 26 may be provided on the stream-line motor housing 183 to assist the steering effect produced by rock of the motor unit as already explained.

Referring to FIGURES 30 and 31 we have therein illustrated a launching craft from which a number of the landing craft may be quickly launched, ready to be manned and sent into action. This launching craft includes the barge or the like, 201ª having the upwardly and outwardly slanting sides 202 and 203, leaving the open stowage space between them. The ends of the craft are not shown, as the showing of these figures is largely schematic. Such launching craft is designed to carry the individual landing craft (or a plurality of them) on hinged carrying plates 204, which are hinged to the upper portions of the sides of the launching craft by the hinges 205. Each of these plates 204 is of length somewhat greater than the length of the landing craft to be carried by such plate, and somewhat wider than the width of such landing craft. The number of landing craft which can be accommodated within the launching craft thus depends on the length of the launching craft.

The carrying plates 204 normally stand within the body of the launching craft, as shown by the left-hand carrying plate in FIGURE 30; and each such plate can be rocked on its hinge substantially 315 degrees to come into the position of the right-hand plate, also shown in FIGURE 30. During stowage of the landing craft within the launching craft the individual landing craft are secured to their respective plates in convenient manner, as by the wide belts provided with buckles (not shown), 206 which are secured to the plates and are brought around the side edges of the plates and over the respective landing craft, and are buckled together behind the windshields of such craft. Additionally each landing craft is held in place on its carrying plate by the tension element 207 secured to the stern of such landing craft and to a convenient portion of the carrying plate close to the hinge of such plate. When each landing craft is to be released from its carrying plate its belt is unbuckled, and the tension element is also released.

Examination of FIGURE 30 shows that the upper hinged end of each carrying plate is formed into a right-angular portion 208, so that while such carrying plate occupies the stowed position within the launching craft, a space is provided between the plate and the proximate wall of the launching craft sufficient to accommodate the height of the landing craft during such stowage. The stowed positions of two such landing craft are shown in FIGURE 30 at 208. Since each carrying plate is hinged to the proximate wall of the launching craft such carrying plate will naturally assume a position such as shown at the left-hand side of FIGURE 30, in which the landing craft carried by such plate comes into contact with the launching craft wall or a buffer or cushion provided on the face of such wall to cushion against shocks due to the buffeting of the launching craft during passage of such craft to the invasion scene. Such cushion will not interfere with free and quick swing of the carrying plate and its landing craft into launching position shown at the right-hand of FIGURE 30.

The several carrying plates are separated from each other a distance sufficient to accommodate the brackets 209 which extend up from the upper portions of the walls 202 and 203 to support the shaft 210 by which shaft the several carrying plates are hingedly supported. Each carrying plate is thus free to be swung over from the stowing position within the launching craft into the launching position, irrespective of launching of other landing craft. However, we have provided the pins 211 which are removably inserted through the bearings of the individual carrying plates and the shaft 210. Thus, any selected carrying plate may be drivingly connected to the shaft 210, so that, by rocking such shaft all such so-selected carrying plates but no others, will be swung from the stowing position into the launching position simultaneously. Suitable power driven means are provided for rocking the shafts at the two sides of the launching craft back and forth as required for the several operations.

Each carrying plate has attached to its outer or free swinging end the float element 212. Such float element is located on the face of the carrying plate opposite to the face to which such landing craft is secured prior to launching. Thus, as each carrying plate is swung into its launching position, its float will come to the surface of the water, and provide the buoyancy needed to sustain such outer or free end of the plate while the landing craft is still present thereon. This condition is shown in the case of the carrying plate at the right-hand side of FIGURE 30. The following functional condition is noted in connection with the foregoing:

It is necessary to make provision for bringing each carrying plate to its launching position with such plate at an angle to the horizontal sufficient to ensure the launching operation freely and without need of launching force other than gravity, as soon as the line 207 has been severed, the retaining belt having also been previously released. Nevertheless, it is necessary to make provision such that the angle of the carrying plate to the horizontal will not be excessive, such as might result in an improper launching operation. It is also noted that as the launching operations proceed, each carrying plate is free to allow its outer end to rise and fall with the waves which may arrive at the launching craft position, and also to accommodate lateral swings of the launching craft itself, during the launching. When the individual carrying plates are disconnected from the shaft 210 by removal of the pins 211 such individual freedom of up and down swing of the carrying plates is afforded.

Due to the depth of the hull of the launching craft, so that its floor 213 is well below the water level, it is seen that during stowage of the landing craft within the hull, the carrying plates may be allowed to assume a nearly vertical position, whereas, when each carrying plate's float comes to the surface of the water, its arrival is arrested with the angle of such carrying plate to the horizontal sufficient to ensure good launching condition, without excessive slant.

Examination of FIGURE 31 shows that each of the carrying plates is provided with a longitudinally extending central slot 214 extending from a position near the hinged end of such carrying plate, to its free end. Such slot is of width sufficient to accommodate the propeller and drive elements, and the fins, which extend below the bottom surface of the landing craft, so that during presence of such landing craft on the carrying plate the landing craft is supported by the side portions 215 and 216 of such plate. It is also noted that although each of the floats 212 is of the full width of the free end of the carrying plate, still the central portion of each such float is depressed to the position shown by the line 217 so that the float does not interfere with free travel of the landing craft along the carrying plate during the launching operation.

From the foregoing descriptions it is seen that the illustrated embodiments both include electric motor driven power-supplying means for the propellers, and also that the source of electricity for such power supply comprises storage batteries. Evidently we are not limited to such form of drive for the propellers, except as we may limit ourselves in the claims to follow, but other power supply means, adapted to the requirements of the present type of craft, may also be used.

When such storage battery electric supplied form of drive is used the batteries may be fully charged prior to coming to the invasion scene, by electric line plugging to the socket element 199, already referred to. The actual delivery of current to the propeller motor is then under some form of control. It is evident, however, that the actual delivery of current to the propeller motor prior to the launching operation would entail needless waste of the battery charge, as well as causing the motor and propeller to be rotated at high speed and without speed limitation. We have therefore provided means to automatically bring the motor into power drive operation as soon as the landing craft enters or touches the water during the launching operation. Such means is shown, schematically, in FIGURES 1 and 2. It comprises the following:

We have provided a float and slip stream unit at the rear portion of the bottom of the craft, and, as shown in such figures, directly behind the propeller 77. This is the unit 218. It comprises a float and slip-stream operated element 219, carried by the lower end of the downwardly extending arm 220, which arm is pivoted at 221 within the open bottom box-like enclosure 222. Such arm carries the contact element 223, insulated from the arm, and, upon raising the arm by action of the float, such contact 223 will engage the stationary contact 224, mounted within the box 222, thus closing a circuit between the two lines 225 and 226. The arm 220 extends through the slotted opening 227 formed in the bottom of the craft, and of length fore and aft, sufficient to permit the needed rocking operations of the arm to be performed without interference by engagement with the bottom of the craft.

Normally the float and arm remain in the full line position shown in FIGURE 2, with the float fully lowered, and, due to the position of the pivotal point, with such float elements in their forward position shown in FIGURE 2. Under these conditions the circuit between the lines 225 and 226 remains open. As soon as the rear portion of the craft strikes the water the float will be raised, with prompt closing of the circuit between the contacts 223 and 224, thus closing the circuit between the lines 225 and 226. These lines comprise a portion of the power supply circuit to the motor, or comprise a portion of the current control elements controlling such motor, so that promptly upon engagement of the stern portion of the craft with the water, the propeller operation will be commenced. The stern of the craft being now in the water, such propeller operation will produce a vigorous slip-stream flowing rearwardly of the craft; and such slip-stream will flow past the float, producing a strong rearward force acting on the float, and serving to ensure that, once the current supply to the motor has been commenced, such current supply will continue as long as motor-propeller operation continues, and until the current supply to the motor is purposely termined by the crewman or by some accident, such as enemy fire. It is noted that such float and arm elements are located close to the center line of the craft, so that during the launching operation they will travel along the slotted opening of the carrying plate, shown at 214 in other figures.

If desired a set of bazooka or rocket type guns may be secured to the fore part of the deck, in advance of the windshield or just behind such windshield and high enough to fire over it. In such case suitable gyroscopic controls may be provided for maintaining such guns trained at a predetermined elevation of target, notwithstanding pitching of the craft by wave and other effects.

If desired, suitable automatic remote controls may be provided on the landing craft, for guiding such craft to its intended point of invasion, either when such craft is manned, or when it is unmanned, and is used to deliver a cargo of such materials as explosives to be detonated at the invasion point. Such operation of guidance may be performed by a standard inertial guidance system. Likewise, if desired such a standard inertial guidance system may be used for returning the craft to its point of departure for re-use of such craft after its original cargo has been discharged.

We claim:

1. In the art of constructing a craft for water borne use, that method of producing the hull of such craft, which consists in first producing two companion shell sections of dish shape, including a first defined section and a second defined section, the first defined section being constituted when in open top position to comprise the bottom portion of the hull, and the second defined section being constituted when in inverted position to comprise the deck portion of the hull, the lower edge portion of the upper shell section being formed to produce along its lower perimeter an upwardly extending flange extending lengthwise of said shell and spaced outwardly away from the shell to produce a lengthwise extending groove along the outer face of such shell with such groove closed along its lower surface and open along its upper portion, and the upper edge portion of the lower shell section being formed to produce along its perimeter a downwardly extending flange extending lengthwise of the shell, spaced inwardly from such shell to produce a lengthwise extending groove along its upper portion and open along its lower portion; said edge portions of the upper and lower shell sections being proportioned and of size and contour for interengagement, each with the other, with the upwardly extending flange portion of the upper shell section aligned with the groove of the lower shell section, and with the downwardly extending flange portion of the lower shell section aligned with the groove of the upper shell section; moving said shell sections towards each other to produce interengagement of the flange portions with the grooves, to produce interlocking of the upper and lower shell sections together; there being, a foaming materials opening and an air and gas exit opening in one section at points separated from each other, introducing foaming components through the first mentioned opening with corresponding exit of air and gas from the second mentioned opening, and allowing the foaming materials to react and to set and solidify into the porous, non-permeable material body wherein the foam producing materials expand during the foaming and setting operation, together with means to support the outer surfaces of the walls of the sections along said integrated portions against outward shift during the foaming operation, to thereby interlock said upper and lower sections with each other.

2. The method as defined in claim 1, together with means acting during the foaming operation to retain the foaming materials from access to a hold space within the hull space during the foaming and setting operations wherein such retaining means comprises an enclosed partition within the hull space and extending between the floor of the first defined section and the deck of the second defined section, said partition enclosing the hold space between said floor and said deck.

3. The method as defined in claim 2, wherein such retaining means comprises a block of material set between the floor of the first defined section and the deck of the second defined section, within the space between the sections, said block being composed of material characterized by the fact that such material is non-adhesive to the foaming material and the foam produced body.

4. A craft for water navigation, comprising in combination a shell of contour and size to define the external surface of the craft including the deck surface of such craft, and said shell including a rail extending up from such deck surface along the edge of at least one side of the craft, together with a body of porous, non-permeable material of specific gravity less than the specific gravity of water, within said shell and occupying a volume of the interior of the shell such that the buoyancy of said body of porous, non-permeable material is at least as great as the light-weight of said craft, including said body of porous, non-permeable material, said body being of solid nature and extending into and filling said rail to reinforce the same together with a bar of reinforcing material extending along within said rail and embedded into said body of porous, non-permeable material.

5. A craft as defined in claim 4, together with an elongated weapon, a weatherproof enclosure for said weapon, a stiff bar within said enclosure, of length greater than said weapon, and means to secure the end portions of such stiff bar to the bar of reinforcing material which is within said rail.

6. A craft as defined in claim 5, wherein said means to secure the end portions of the stiff bar to the bar of reinforcing material which is within said rail, comprises studs secured to the reinforcing bar and projecting up through the rail surface portion of the shell, together with means to connect the end portions of the stiff bar and the proximate portions of the weatherproof enclosure, to said studs.

7. A craft as defined in claim 5, together with a pair of cooperating weapon gripping clips connected to the bar of reinforcing material and projecting upwardly from the rail in position to clamp the weapon and the weatherproof enclosure to the rail at a point between the ends of such weapon.

8. A craft as defined in claim 7, wherein one of the clips is an inboard clip and is secured stationary to the bar of reinforcing material, and the other clip is an outboard clip and is hinged to such stationary clip.

9. A craft for water navigation, comprising in combination a shell of contour and size to define the external surfaces of the craft, including the deck of such craft, steering means in connection with the craft, stering control means above the deck of the craft, including a rockable element extending through the deck to the interior of the craft, operative connections between said rockable element and the steering means constituted to actuate the steering means with actuations of the steering control means, the steering control means including a gun supporting element, a universal joint connection between said gun supporting element and the rockable element constituted to permit lateral and vertical swings of the gun supporting element with rock of the rockable element corresponding to said lateral swings of the gun supporting element.

10. A craft as defined in claim 9, wherein the gun supporting element includes means to releasably connect the gun to said element.

11. A craft as defined in claim 9, together with a windshield, means to connect such windshield to the deck of the craft at a location in advance of the steering control means, and a gun barrel receiving opening in the windshield, said gun barrel receiving opening being constituted to accommodate the gun barrel corresponding to lateral swings of the gun supporting element.

12. A craft as defined in claim 11, wherein said gun barrel opening in the windshield is constituted to accommodate the gun barrel corresponding to the vertical swings of the gun supporting element.

References Cited by the Examiner
UNITED STATES PATENTS

| | | | |
|---|---|---|---|
| 742,951 | 11/1903 | Adriance et al. | 220—77 |
| 1,789,415 | 1/1931 | Phillips | 11—18 |
| 2,228,204 | 1/1941 | Dimmock | 114—218 |
| 2,319,855 | 5/1943 | Forsberg | 114—43.5 |
| 2,349,728 | 5/1944 | Hopkins | 114—1 |
| 2,381,631 | 8/1945 | Waring | 9—6 |
| 2,386,650 | 10/1945 | Bell | 114—43.5 |
| 2,417,508 | 3/1947 | Leyde. | |
| 2,629,356 | 2/1953 | Whiting | 114—144 |
| 2,653,139 | 9/1953 | Sterling. | |
| 2,711,148 | 6/1955 | Schmidt | 114—.5 |
| 2,812,736 | 11/1957 | Fry | 115—70 |
| 2,866,985 | 1/1959 | Blackmore | 9—6 |
| 2,901,757 | 9/1959 | Remington | 115—70 |
| 2,919,392 | 12/1959 | Smith. | |
| 2,929,539 | 3/1960 | Safreno | 211—64 |
| 2,956,292 | 10/1960 | Newsome | 9—6 |
| 2,956,536 | 10/1960 | Kilvington | 115—35 |
| 3,007,208 | 11/1961 | Urban | 9—6 X |
| 3,013,922 | 12/1961 | Fisher | 9—6 X |
| 3,036,539 | 5/1962 | Storey | 114—.5 |
| 3,054,372 | 9/1962 | Jones | 115—70 X |
| 3,088,330 | 5/1963 | Thompson | 114—144 |
| 3,093,844 | 6/1963 | Brock et al. | 9—1 |
| 3,095,849 | 7/1963 | Breunich | 115—18 |

MILTON BUCHLER, *Primary Examiner.*

EMILE PAUL, FERGUS S. MIDDLETON, *Examiners.*

T. M. BLIX, D. P. NOON, *Assistant Examiners.*